(12) United States Patent
Roses et al.

(10) Patent No.: US 8,167,771 B2
(45) Date of Patent: May 1, 2012

(54) VEHICLE LAUNCH DEVICE HAVING FLUID COUPLING

(75) Inventors: Victor M. Roses, Ann Arbor, MI (US); John C. Schultz, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 12/428,931

(22) Filed: Apr. 23, 2009

(65) Prior Publication Data

US 2010/0273603 A1  Oct. 28, 2010

(51) Int. Cl.
*B60W 10/02* (2006.01)

(52) U.S. Cl. ............................. 477/5; 192/3.28

(58) Field of Classification Search ............... 477/5, 62, 477/64, 65, 67, 68, 168, 169, 166, 174, 176, 477/180; 192/3.25–3.27, 3.63, 3.29–3.3
See application file for complete search history.

(56) References Cited

U.S. PATENT DOCUMENTS

| | | | | |
|---|---|---|---|---|
| 5,789,823 A * | 8/1998 | Sherman | | 290/47 |
| 6,935,450 B1 * | 8/2005 | Tsuzuki et al. | | 180/65.26 |
| 7,357,754 B2 * | 4/2008 | Roses | | 477/143 |
| 2005/0155803 A1 * | 7/2005 | Schiele | | 180/65.2 |
| 2007/0021266 A1 * | 1/2007 | Roses | | 477/86 |
| 2008/0000746 A1 * | 1/2008 | Schiele et al. | | 192/3.54 |
| 2009/0286648 A1 * | 11/2009 | Vesenjak | | 477/70 |
| 2009/0321157 A1 * | 12/2009 | Sowul et al. | | 180/65.22 |
| 2010/0087290 A1 * | 4/2010 | Schoenek et al. | | 477/5 |
| 2010/0273606 A1 * | 10/2010 | Roses et al. | | 477/62 |

* cited by examiner

*Primary Examiner* — Hau Phan
*Assistant Examiner* — Emma K Frick

(57) ABSTRACT

A method of controlling an automatic shifting power transmission having a fluid coupling device, at least one reaction clutch disposed in series with the fluid coupling device, and an electric machine disposed in series with the fluid coupling device and the at least one reaction clutch includes energizing the electric machine to provide additional torque to the first gear reaction clutch when the automatic shifting power transmission is in a first gear launch maneuver and partially engaging the at least one reaction clutch corresponding to a first gear engagement to effect the first gear launch maneuver when engine load is at or above a predetermined value. The at least one reaction clutch corresponding to the first gear engagement is fully engaged when engine load is below the predetermined value.

9 Claims, 3 Drawing Sheets

VEHICLE LAUNCH DEVICE HAVING FLUID COUPLING

FIELD

The present disclosure relates to a mechanism and method of controlling an automatic shifting power transmission.

BACKGROUND

The statements in this section merely provide background information related to the present disclosure and may or may not constitute prior art.

In automatic shifting power transmissions, gear ratio changes are effected by selectively connecting members of planetary gear sets. This is accomplished by selectively engaging torque-transmitting devices such as brakes or clutches. For each gear ratio change, there is a corresponding sequence of off-going clutch disengagement and on-coming clutch engagement. By providing a regulated fluid pressure gain to the clutches, the smooth engagement and disengagement of the clutches may be accomplished.

Additionally, a majority of automatic shifting power transmissions employ a hydrodynamic fluid drive, such as a torque converter or a fluid coupling, between the power source (engine) and a multi-speed gear configuration, such as the planetary gear arrangement discussed above. This hydrodynamic fluid drive will allow the vehicle to come to rest without stalling the engine and will provide a measure of isolation preventing the torsional vibrations, caused by the firing events of the engine, from being transmitted though the powertrain.

As is well known, the hydrodynamic fluid drive is a slipping drive that has a high efficiency loss at vehicle launch. This loss decreases, but is still present, as the hydrodynamic fluid drive approaches a 1 to 1 speed ratio at high speed and low torque.

The stall speed of the hydrodynamic fluid drive is an important consideration for proper vehicle launch. The stall speed is the speed at which the hydrodynamic fluid drive will hold the engine speed and not allow further gain. The stall speed is usually chosen based on engine torque characteristic, vehicle weight, vehicle duty cycle, etc. A properly selected stall speed will allow the engine to spin to the peak torque range to affect a strong vehicle launch.

However, once a hydrodynamic fluid drive is selected with a specific stall speed that stall speed cannot be adjusted regardless of changing conditions or circumstances. Therefore, it is desired to be able to alter the effective stall speed of the hydrodynamic fluid drive. Under certain circumstances a higher stall speed is desired to improve launch performance of the transmission. Under other circumstances, a lower stall speed is beneficial by providing sufficient launch performance while improving efficiency or other performance parameters. Accordingly, there is room in the art for controlling a powertrain to modify the stall characteristics of a fluid coupling device to increase efficiency.

SUMMARY

In one example of the present disclosure a method of a hybrid powertrain having a transmission is provided. The transmission includes a fluid coupling device, at least one reaction clutch disposed in series with the fluid coupling device, and an electric machine disposed in series with the fluid coupling device and the at least one reaction clutch. The method includes the steps of energizing the electric machine to provide additional torque to the torque transmitted by the fluid coupling device when the automatic shifting power transmission is in a first gear launch maneuver and partially engaging the at least one reaction clutch corresponding to a first gear engagement to effect the first gear launch maneuver when engine load is at or above a predetermined value.

The at least one reaction clutch corresponding to the first gear engagement is fully engaged when engine load is below the predetermined value.

In one example of the present disclosure the method further includes providing a one way clutch disposed in series with the fluid coupling device and the electric machine.

In another example of the present disclosure the one-way clutch is configured to transmit torque from the fluid coupling device to the electric machine and to prevent torque from transmitting from the electric machine to the fluid coupling device when the electric machine overruns the fluid coupling device.

In yet another example of the present disclosure the method further includes disengaging the first of the at least one reaction clutch corresponding to the first gear engagement when the automatic shifting power transmission is in either a drive or a neutral gear state and an engine is idling.

In yet another example of the present disclosure the method further includes providing a lock-up clutch disposed in parallel with the fluid coupling device.

In yet another example of the present disclosure the lock-up clutch is an electronically controlled capacity clutch.

In yet another example of the present disclosure the method further includes fully engaging another of the at least one reaction clutch corresponding to the appropriate gear engagement when the automatic shifting power transmission is in second gear or higher; and engaging a lock-up clutch disposed in parallel with respect to the fluid coupling device.

The present disclosure also provides a powertrain including an electric machine, a fluid coupling device in series relationship with the electric machine, a first gear clutch in series relationship with the fluid coupling device, the first gear clutch being operable to slip during a first gear launch, and a one-way clutch in series relationship with the reaction clutch and the fluid coupling device. The one-way clutch is operable to selectively disconnect the electric machine from the fluid coupling device.

The powertrain of the present disclosure also includes a lock-up clutch in parallel relationship with the fluid coupling device.

In one example of the present disclosure, the lock-up clutch is an electronically controlled capacity clutch.

In another example of the present disclosure, the one-way clutch is disposed between the fluid coupling device and the electric machine.

Another example of a method of controlling a powertrain according to the principles of the present disclosure includes the steps of providing a fluid coupling device in series relationship with a primary engine and a transmission output shaft, providing an electric machine in series relationship with the fluid coupling device and the transmission output shaft, providing a first gear reaction clutch in series relationship with the fluid coupling device, the electric machine, and the transmission output shaft, providing a lock-up clutch in parallel relationship with the fluid coupling device, monitoring a load on the primary engine, partially engaging the first gear reaction clutch when the load on the primary engine is at or above a first predetermined value to effect the first gear launch, energizing the electric machine during the first gear launch to provide additional torque to the torque transmitted by the fluid coupling device, and partially engaging the lock-up clutch and fully engaging the first gear reaction clutch when the load on the primary engine is at or below a second predetermined value.

In another example of the present disclosure, the first predetermined value is approximately equal to the second predetermined value.

In yet another example of the present disclosure, the method includes the step of fully engaging the first gear reaction clutch and fully disengaging the lock-up clutch when the load on the primary engine is between the first predetermined value and the second predetermined value.

In yet another example of the present disclosure, the method includes the step of disengaging the first gear reaction clutch when the transmission is in either a drive or a neutral gear state and the primary engine is idling.

Further objects, examples and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

Figure 1:
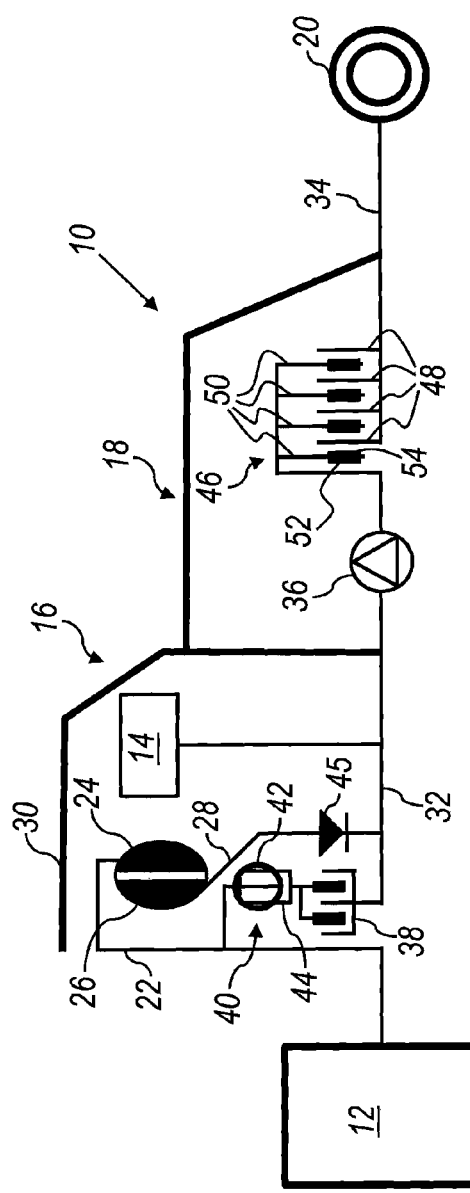
FIG. 1 is a schematic view of an embodiment of a powertrain according to the present disclosure.

With reference to FIG. 1, a powertrain according to the principles of the present disclosure is generally indicated by reference number 10. The powertrain 10 includes a first or primary power source 12, a second or secondary power source 14, a fluid coupling device 16, a transmission 18, and a final drive mechanism 20. In the example provided, the first power source 12 is an internal combustion engine, however the first power source 12 may be an electric motor or machine without departing from the scope of the present disclosure. The first power source 12 includes an output member 22. The first power source 12 is operable to provide an output torque or power to the output member 22. The second power source 14 is preferably an electric machine having a stator and rotor, as is known in the art.

The fluid coupling device 16 includes a pump section 24 and a turbine section 26. The fluid coupling device 16 includes a hydraulic fluid, such as an oil, located within the pump section 24 and the turbine section 26 that hydrodynamically couples the pump section 24 with the turbine section 26, as is known in the art. The pump section 24 is interconnected with the output member 22 of the first power source 12. The turbine section 24 is interconnected with a first intermediate or interconnecting member 28. The fluid coupling device 16 is preferably located in a bell housing portion 30 forward of the transmission 18.

The transmission 18 is preferably a multi-speed automatic shifting power transmission and includes a transmission gearbox input shaft 32 and a transmission output shaft 34. The transmission gearbox input shaft 32 is interconnected to the second power source 14. A mechanical transmission pump 36 is connected with the transmission gearbox input shaft 32 and is operable to provide pressurized hydraulic fluid to the various components of the transmission 18. The transmission 18 further includes a plurality of gear sets (not shown) and torque transmitting devices (not shown) that cooperate to provide a plurality of forward and reverse gear or speed ratios between the transmission gearbox input shaft 32 and the transmission output shaft 34.

The final drive mechanism 20 is interconnected to the transmission output shaft 34. The final drive mechanism 20 may have various components without departing from the scope of the present disclosure and may include a differential, axles, and drive wheels.

The powertrain 10 further includes a lock-up clutch 38 in parallel with the fluid coupling device 16. More specifically, the lock-up clutch 38 is interconnected to the engine output member 22 and the transmission gearbox input shaft 32. The lock-up clutch 38 is operable to lock the engine output member 22 to the transmission gearbox input shaft 32 thereby allowing them to rotate in unison. By locking the transmission gearbox input shaft 32 to the engine output member 22, the efficiency of the powertrain 10 will increase by reducing the slip losses of the fluid coupling device 16. In a preferred embodiment, the lock-up clutch 38 is an electronically controlled capacity clutch. The electronically controlled capacity clutch will allow a slight amount of slip to occur between the transmission gearbox input shaft 32 and the engine output member 22. This slip decouples the transmission gearbox input shaft 32 and the engine output member 22 and helps to attenuate the transmission 18 of torsional vibrations created by the firing events of the primary power source 12 to the remainder of the powertrain 10.

In the example provided, the engine output member 22 includes a damper 40 in series with the lock-up clutch 40 and the first power source 12. The damper 40 operates to further isolate the torsional vibrations created by the firing events of the first power source 12. The damper 40 may include a compliant member 42 such as a spring. The damper 40 may also include a lock-out clutch 44 operable to bypass the compliant member 42. The lock-out clutch 44 is useful when starting or stopping the primary power source 12 as the primary power source 12 may produce a resonance at low engine speeds.

The powertrain 10 includes a one-way clutch 45 interconnected with the first intermediate or interconnecting member 28 and the transmission gearbox input shaft 32. The one-way clutch 45 does not hold or transmit torque in one direction of rotation and holds torque or overruns in the other direction of rotation, as is known in the art. By selectively decoupling the secondary power source 14 from the fluid coupling device 16 spin losses are minimized when the secondary power source 14 is energized.

The powertrain 10 further includes a reaction clutch 46 located within the transmission 18 and interconnected with the transmission gearbox input shaft 32 and the transmission output shaft 34. The reaction clutch 46 is selectively engageable and operable to selectively lock and unlock the transmission gearbox input shaft 32 with the transmission output shaft 34. The reaction clutches 46 is preferably a fluid-operated multi-plate clutch. The reaction clutches 46 is selectively controlled in engaged and disengaged states by conventional electro-hydraulic mechanisms, not shown, which include a hydraulic valve arrangement and an electronic control unit (ECU) that incorporates a conventional programmable digital computer. The reaction clutch 46 is engaged and disengaged in accordance with performance and operating signals such as, for example, engine speed, vehicle speed, and engine torque to name a few. Those familiar with the art of transmission control will be familiar with the many features and functions that are available with electronic controls. The reaction clutch 46 may alternatively be a brake and may be associated with a first forward gear ratio. The transmission 18 preferably includes additional reaction clutches and brakes whose engagement correspond to additional forward and reverse speed ratios.

The reaction clutch 46 includes a plurality of reaction plates 48 interleaved with a plurality of friction plates 50. Each of the friction plates 50 has a first friction-facing layer 52 and a second friction-facing layer 54 each disposed on opposite faces of the friction plate 50. The friction-facing layers 52 and 54 frictionally engage the reaction plates 48.

FIG. 1 is a schematic representation of the powertrain 10 illustrating the neutral/drive gear state and engine idle mode of operation. In this mode, the reaction clutch 46 is disengaged, thereby decoupling the transmission output shaft 34 from the transmission gearbox input shaft 32 and thereby minimizing the reaction force imparted on the turbine section 26 of the fluid coupling device 16. As a result, the parasitic losses produced by partially engaging the fluid coupling device 16 are minimized.

Figure 2:
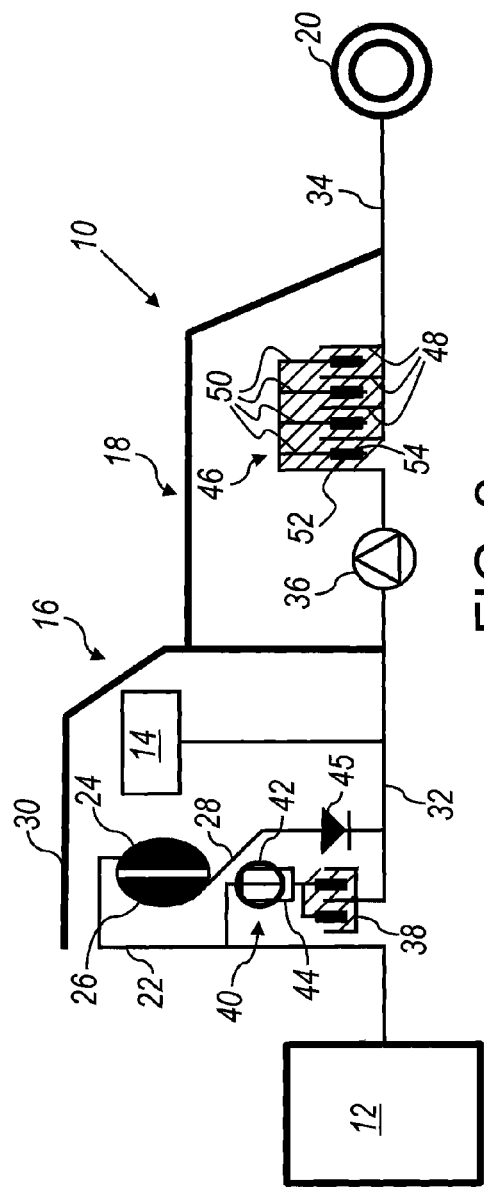
FIG. 2 is a schematic view of an embodiment of a powertrain according to the present disclosure in a first gear launch mode of operation.

With reference to FIG. 2, a schematic representation of the powertrain 10 is shown that illustrates the first gear launch mode of operation. In this mode, the fluid coupling device 16 is filled and charged with hydraulic fluid, the second power source 14 is optionally engaged to provide additional torque to the transmission gearbox input shaft 32, and the reaction clutch 46 and the lock-up clutch 38 may be controlled in a partially engaging condition in order to vary the stall speed of the fluid coupling device 16. More specifically, in order to increase the stall speed of the fluid coupling device 16, the reaction clutch 46 is controlled in a partially engaging condition. By partially engaging the reaction clutch 46, the first power source 12 can spin to its peak torque band to allow a strong vehicle launch. In effect, partially engaging the reaction clutch 46 artificially tunes the stall speed of the fluid coupling device 16 thereby enabling the usage of a highly efficient or "tight" fluid coupling device 16, which may provide efficiency gains in other areas of vehicle operation such as part throttle operation. Consideration should be paid to the selection of materials for the friction facing layers 52 and 54, as they will be subject to a more severe duty cycle. In order to decrease the stall speed of the fluid coupling device 16, the lock-up clutch 38 is controlled in a partially engaging condition. By partially engaging the lock-up clutch 38, for any given speed of the first power source 12 some of the torque from the first power source 12 by-passes the fluid coupling device 16 through the lock up clutch 38 to the locked reaction clutch 46 and the transmission output shaft 34. In addition, the secondary power source 14 may be engaged to assist in providing additional torque to the torque transmitted by the fluid coupling device 16.

Figure 3:
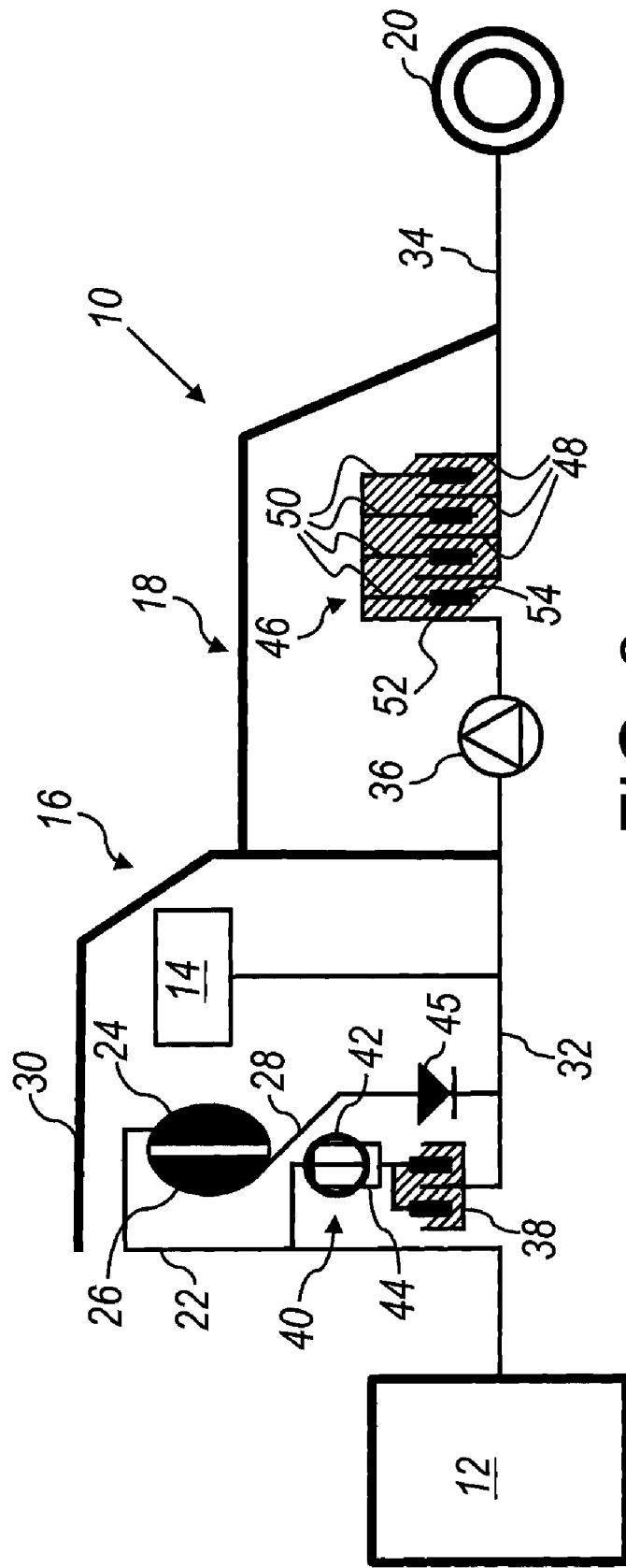
FIG. 3 is a schematic view of an embodiment of a powertrain according to the present disclosure in a second gear or higher mode of operation.

Turning now to FIG. 3, the powertrain 10 is shown in a second gear and higher mode of operation. In this mode of operation, the fluid coupling device 16 is only partially filled with hydraulic fluid thereby reducing spin losses within the fluid coupling device 16, the reaction clutch 46 is closed or fully engaged, and the lock-up clutch 38 is closed or fully engaged. Accordingly, a zero slip condition is maintained between the engine output member 22 and the transmission gearbox input shaft 32 and a zero slip condition is maintained between the transmission gearbox input shaft 32 and the transmission output shaft 34.

In pure electric mode of operation where the primary power source 12 is disengaged and the second power source 14 is engaged, the one-way clutch 45 disconnects the transmission gearbox input shaft 32 from the first intermediate or interconnecting member 28 and the fluid coupling device 16 when the second power source 14 overruns the one-way clutch 45. This reduces parasitic losses from the partially filled fluid coupling device 16.

The operating conditions shown in FIG. 2 are effective at high engine load, such as values over a first predetermined value of manifold air pressure (MAP), and at low engine loads, such as values under a second predetermined value of MAP. More specifically, at engine loads at or above the first predetermined value, the reaction clutch 46 is slipped. For engine loads at or below the second predetermined value, the reaction clutch 46 is fully engaged and the lock-up clutch 38 is slipped. For engine loads between these predetermined values, the lock-up clutch 38 is engaged and the reaction clutch 46 is fully engaged. For low MAP values after first gear launch, the operating condition shown in FIG. 3 will be commanded (i.e. both clutches 38 and 46 are fully engaged).

Figure 4:
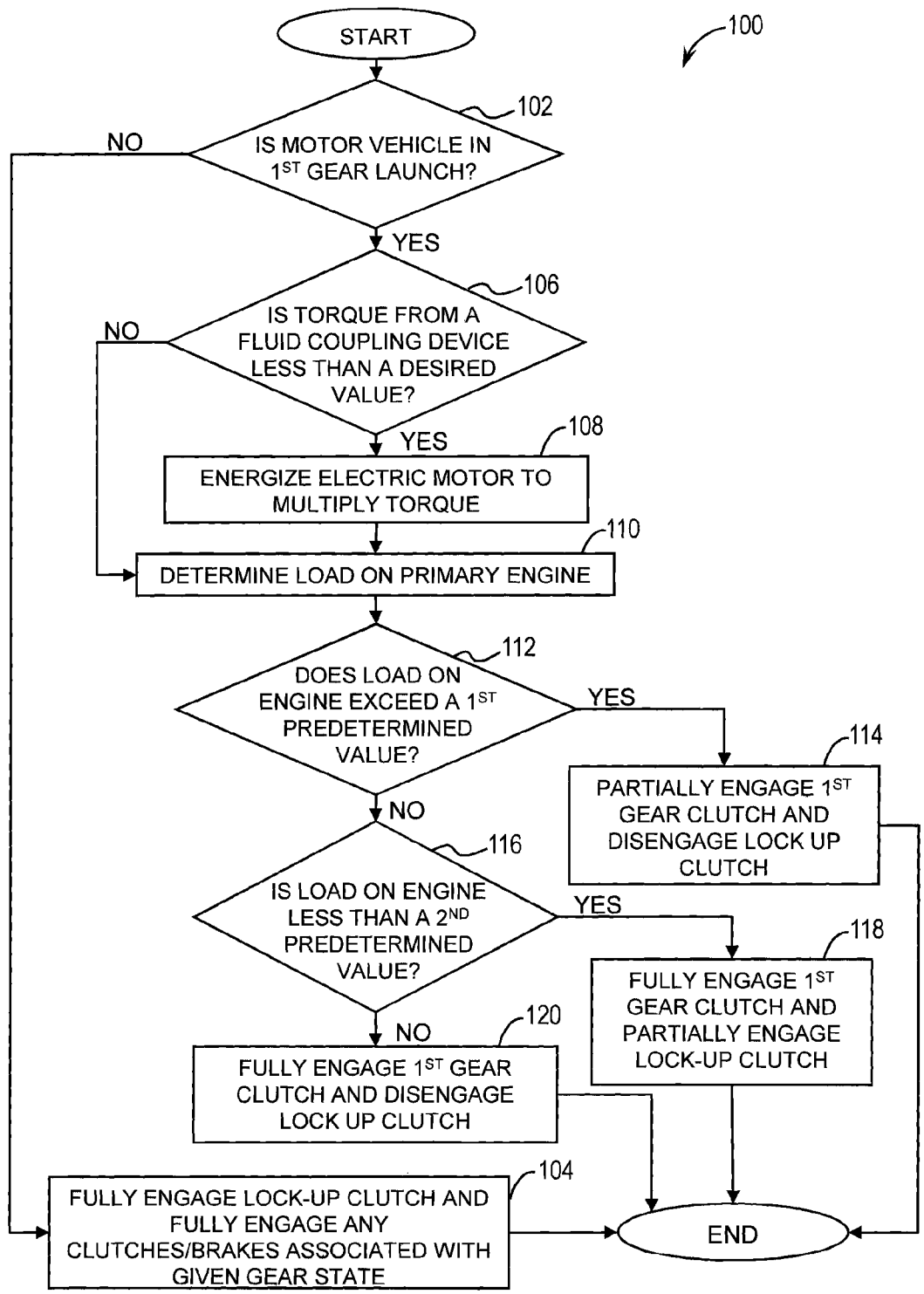
FIG. 4 is a flow chart illustrating the steps of a method of operating the powertrain according to the principles of the present disclosure.

With reference to FIG. 4, and continued reference to FIGS. 1-3, a method 100 for controlling the powertrain 10 will now be described. The method begins at step 102 where it is determined whether the motor vehicle is in a first gear launch state (i.e. corresponding to first gear engagement, zero initial vehicle speed, and accelerator pedal engagement). If the motor vehicle is not in a first gear launch state, then the method proceeds to step 104 where the lock up clutch 38 and any clutches or brakes, including the reaction clutch 46, associated with the given gear speed are fully engaged. If the motor vehicle is in a first gear launch state the method 100 proceeds to step 106 where the torque transmitted from the fluid coupling device 16 is compared to a desired value in order to determine whether the fluid coupling device 16 is providing enough torque for the motor vehicle during launch. If the torque transmitted from the fluid coupling is less than the desired value, the secondary power source 14 is energized at step 108 in order to provide additional torque to the transmission 18. The method 100 then proceeds to step 110. If the torque from the fluid coupling device meets or exceeds the desired value, then no additional torque is necessary, and the method 100 proceeds to step 110 where the engine load is determined.

Next, at step 112, the engine load is compared to a first predetermined load value. If the engine load exceeds the first predetermined load value, then the method proceeds to step 114 where the reaction clutch 46 associated with first gear is partially engaged (i.e. allowed to slip) and the lock up clutch 38 is disengaged. If the load on the engine does not exceed the first predetermined value, then the method 100 proceeds to step 116 where the engine load is compared to a lower, second predetermined load value. If the load on the engine is less than the second predetermined value, then the method 100 proceeds to step 118 where the lock up clutch 38 is partially engaged (i.e. allowed to slip) and the reaction clutch 46 associated with first gear is fully engaged.

If the load on the engine is not less than the second predetermined load value (i.e. the load on the engine falls within a range between the first and second predetermined load values), then the method proceeds to step 120 where the lock up clutch 38 is disengaged and the reaction clutch 46 associated with first gear is fully engaged. This condition results in normal or unmodified stall performance from the fluid coupling device.

For higher gear states, the secondary power source 14 may be selectively engaged to either generate power for batteries or provide torque to the transmission 18. The one way clutch 45 limits spin losses associated with overrunning by the secondary power source 14.

The benefits of the present disclosure may include enhanced fuel economy, enhanced driveability over a wide range of operating conditions, and improved lock-up clutch performance. Additionally the present disclosure may reduce cost, mass, and packaging requirements by eliminating the stator within the torque converter or enabling the use of a smaller torque converter in some applications.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A method of controlling an automatic shifting power transmission coupled to an engine, the automatic shifting power transmission having a fluid coupling device, at least one first gear reaction clutch disposed in series with the fluid coupling device, wherein an electric machine is disposed in series with the fluid coupling device and the at least one first gear reaction clutch, and a lock-up clutch disposed in parallel with the fluid coupling device, the method comprising:
    energizing the electric machine when the automatic shifting power transmission is in a first gear launch to provide additional torque to the at least one first gear reaction clutch;
    partially engaging the at least one first gear reaction clutch when engine load is at or above a first predetermined value to effect the first gear launch;
    fully engaging the at least one first gear reaction clutch when engine load is below a second predetermined value; and
    engaging the first gear reaction clutch and fully disengaging the lock-up clutch when the load on the primary engine is between the first predetermined value and the second predetermined value.

2. The method of controlling an automatic shifting power transmission of claim 1 further comprising providing a one way clutch disposed in series with the fluid coupling device and the electric machine.

3. The method of controlling an automatic shifting power transmission of claim 2 wherein the one-way clutch is configured to transmit torque from the fluid coupling device to the electric machine and to prevent torque from transmitting from the electric machine to the fluid coupling device when the electric machine overruns the fluid coupling device.

4. The method of controlling an automatic shifting power transmission of claim 1 further comprising disengaging the at least one first gear reaction clutch when the automatic shifting power transmission is in either a drive or a neutral gear state and the engine is idling.

5. The method of controlling an automatic shifting power transmission of claim 1, wherein the lock-up clutch is an electronically controlled capacity clutch.

6. The method of controlling an automatic shifting power transmission of claim 1 further comprising fully engaging at least one second gear reaction clutch when the automatic shifting power transmission is in a second gear and engaging the lock-up clutch.

7. A method of controlling a transmission in a powertrain, the powertrain having a primary engine, the method comprising:
    providing a fluid coupling device in series relationship with the primary engine and a transmission output shaft;
    providing an electric machine in series relationship with the fluid coupling device and the transmission output shaft;
    providing a first gear reaction clutch in series relationship with the fluid coupling device, the electric machine, and the transmission output shaft;
    providing a lock-up clutch in parallel relationship with the fluid coupling device;
    energizing the electric machine during a first gear launch to provide additional torque to the first gear reaction clutch;
    monitoring a load on the primary engine;
    partially engaging the first gear reaction clutch when the load on the primary engine is at or above a first predetermined value to effect the first gear launch; and
    partially engaging the lock-up clutch and fully engaging the first gear reaction clutch when the load on the primary engine is at or below a second predetermined value; and
    engaging the first gear reaction clutch and fully disengaging the lock-up clutch when the load on the primary engine is between the first predetermined value and the second predetermined value.

8. The method of claim 7 wherein the first predetermined value is approximately equal to the second predetermined value.

9. The method of claim 7 further comprising disengaging the first gear reaction clutch when the transmission is in either a drive or a neutral gear state and the primary engine is idling.

* * * * *